(12) United States Patent
Park et al.

(10) Patent No.: US 10,582,493 B2
(45) Date of Patent: Mar. 3, 2020

(54) METHODS FOR TRANSMITTING UPLINK DATA OF A NARROWBAND IOT USER EQUIPMENT AND APPARATUSES THEREOF

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 214 days.

(21) Appl. No.: 15/454,152

(22) Filed: Mar. 9, 2017

(65) Prior Publication Data
US 2017/0273079 A1    Sep. 21, 2017

(30) Foreign Application Priority Data

Mar. 15, 2016 (KR) .................. 10-2016-0031188
Mar. 30, 2016 (KR) .................. 10-2016-0038386
Oct. 6, 2016   (KR) .................. 10-2016-0128810

(51) Int. Cl.
*H04W 4/00*   (2018.01)
*H04W 72/04*  (2009.01)
*H04L 27/26*  (2006.01)
*H04L 5/00*   (2006.01)
*H04L 29/08*  (2006.01)

(52) U.S. Cl.
CPC ....... *H04W 72/0446* (2013.01); *H04L 5/0094* (2013.01); *H04L 27/2602* (2013.01); *H04L 27/2646* (2013.01); *H04W 72/042* (2013.01); *H04L 5/001* (2013.01); *H04L 5/0035* (2013.01); *H04L 67/12* (2013.01); *H04W 72/0453* (2013.01)

(58) Field of Classification Search
CPC .................................................. H04W 72/042
See application file for complete search history.

(56) References Cited

U.S. PATENT DOCUMENTS

| | | | |
|---|---|---|---|
| 9,686,798 B1* | 6/2017 | Zhao .............. | H04W 72/1257 |
| 2013/0028118 A1* | 1/2013 | Cherian .......... | H04W 72/005 |
| | | | 370/252 |
| 2017/0280429 A1* | 9/2017 | Shen .............. | H04W 72/0446 |
| 2017/0311326 A1* | 10/2017 | Wong .............. | H04W 72/0453 |
| 2018/0049164 A1* | 2/2018 | Wu ................ | H04W 72/042 |

(Continued)

OTHER PUBLICATIONS

Ericsson, "NB-PUSCH Resource Allocation", R1-161033, 3GPP TSG-RAN1 #84, Feb. 15-19, 2016, St Julian's, Malta, pp. 1-4.

(Continued)

*Primary Examiner* — Guang W Li
(74) *Attorney, Agent, or Firm* — IP Legal Services, LLC (57) ABSTRACT

Provided are a method and an apparatus for allocating a resource of an uplink data channel of the narrowband Internet of things (NB IoT) user equipment to transmit and receive a data using a narrow band. The method may include receiving downlink control information (DCI) including a subcarrier indication field from a base station, configuring a wireless resource of an uplink data channel based on at least one of i) a subcarrier indication field and ii) subcarrier spacing information configured to the NB IoT user equipment, and transmitting an uplink data using a wireless resource of an uplink data channel.

8 Claims, 8 Drawing Sheets

| Subcarrier indication field | Set of Allocated subcarriers |
|---|---|
| 0 – 11 | 0 – 11 |
| 12-15 | {0, 1, 2}, {3, 4, 5}, {6, 7, 8}, {9, 10, 11} |
| 16-17 | {0, 1, 2, 3, 4, 5}, {6, 7, 8, 9, 10, 11} |
| 18 | {0, 1, 2, 3, 4, 5, 6, 7, 8, 9, 10, 11} |
| 19-63 | Reserved |

(56) References Cited

U.S. PATENT DOCUMENTS

| | | | |
|---|---|---|---|
| 2018/0249433 A1* | 8/2018 | Shin | H04L 5/0005 |
| 2018/0287761 A1* | 10/2018 | You | H04L 5/00 |
| 2018/0287846 A1* | 10/2018 | Kim | H04L 5/00 |
| 2018/0317241 A1* | 11/2018 | Xia | H04W 72/042 |
| 2018/0332610 A1* | 11/2018 | Xia | H04W 72/04 |
| 2018/0376484 A1* | 12/2018 | Beale | H04W 72/085 |
| 2019/0007174 A1* | 1/2019 | Takeda | H04L 1/1854 |
| 2019/0021089 A1* | 1/2019 | Zhang | H04W 72/0453 |

OTHER PUBLICATIONS

ZTE, "Uplink Data Channel with 3.75 kHz Subcarrier Spacing for NB-IoT", R1-160054, 3GPP TSG RAN WG1 NB-IoT Ad-Hoc Meeting, Budapest, Hungary, Jan. 18-20, 2016, pp. 1-4.

Huawei et al., "DCI for NB-IoT", R1-160323, 33GPP TSG RAN WG1 Meeting #84, St Julian's, Malta, Feb. 15-19, 2016, pp. 1-4.

* cited by examiner

| Subcarrier indication field | Set of Allocated subcarriers |
|---|---|
| 0 – 11 | 0 – 11 |
| 12-15 | {0, 1, 2}, {3, 4, 5}, {6, 7, 8}, {9, 10, 11} |
| 16-17 | {0, 1, 2, 3, 4, 5}, {6, 7, 8, 9, 10, 11} |
| 18 | {0, 1, 2, 3, 4, 5, 6, 7, 8, 9, 10, 11} |
| 19-63 | Reserved |

METHODS FOR TRANSMITTING UPLINK DATA OF A NARROWBAND IOT USER EQUIPMENT AND APPARATUSES THEREOF

CROSS-REFERENCE TO RELATED APPLICATION

This application claims priority from Korean Patent Application No. 10-2016-0031188 filed on Mar. 15, 2016, No. 10-2016-0038386 filed on Mar. 30, 2016 and No. 10-2016-0128810 filed on Oct. 6, 2016, which are hereby incorporated by reference for all purposes as if fully set forth herein.

BACKGROUND

1. Field of the Disclosure

The present disclosure relates to a technology for transmitting and receiving an uplink data of a NarrowBand Internet of Things (NB IoT) user equipment in $3^{rd}$ generation partnership project (3GPP) long term evolution (LTE)/LTE-Advanced system. Specifically, the present disclosure relates to a method and an apparatus for allocating resources of an uplink data channel of a NB IoT user equipment which transmits and receives a data using a narrowband.

2. Description of the Related Art

Internet of Things (IoT) devices have been connected worldwide through a network, and the number thereof has been increasing rapidly. In this situation, there is a demand for a technology to efficiently process data transmission and reception of such a large number of IoT devices.

For example, a large number of the IoT devices are installed in a wide area, and each of them requires stable network connection with low cost and low power consumption. In addition, the IoT device is characterized as intermittently transmitting and receiving a small amount of data. Therefore, the large number of the IoT devices may cause increment of unnecessary power consumption and cost when the IoT devices use the typical LTE or LTE-Advanced technology for communication. In addition, there is a limitation to enable such a large number of IoT devices to communicate each other because a licensed band has limited wireless resources.

To solve these problems, LORA (LongRange) is introduced. LORA is a dedicated network technology for the IoT communication using an unlicensed band frequency. Further, NB IoT (NarrowBand IoT) technology is also introduced for the IoT communication based on LTE network technology.

Especially, NB IoT performs communication using Narrow Band for increasing device acceptance and reducing power consumption and cost. Also, NB IoT enhances service coverage through a technology of data transmission repetition. Also, NB IoT can selectively or simultaneously apply a single tone transmission method or a multi tone transmission method by each of user equipment.

Accordingly, because one NB IoT user equipment has a transmission method different from the other, it is necessary to dynamically change wireless resource and transmission timing for receiving a downlink data and transmitting an uplink signal differently from these in the typical LTE technology.

SUMMARY

One embodiment disclosed in the above background is to propose a method and procedure for allocating a wireless resource of uplink data channel for transmitting uplink data of a NB IoT user equipment by a base station.

In addition, one embodiment is to propose a method and procedure for configuring a frequency axis resource of an uplink data channel using downlink control information by a NB IoT user equipment.

One embodiment to solve the above problem provides a method for transmitting an uplink data by a NarrowBand Internet of Things (NB IoT) user equipment. The method may include receiving downlink control information (DCI) including a subcarrier indication field from a base station, configuring a wireless resource of an uplink data channel based on at least one of i) a subcarrier indication field and ii) subcarrier spacing information configured to the NB IoT user equipment, and transmitting the uplink data using the wireless resource of the uplink data channel.

In addition, one embodiment provides a method for receiving an uplink data from a NB IoT user equipment by a base station. The method may include transmitting downlink control information (DCI) including a subcarrier indication field to a NB IoT user equipment, and receiving a uplink data from the NB IoT user equipment through a wireless resource of an uplink data channel which is configured based on at least one of i) a subcarrier indication field and ii) subcarrier spacing information configured to the NB IoT user equipment.

In addition, one embodiment provides a NB IoT user equipment transmitting an uplink data. The NB IoT user equipment may include a receiving unit configured to receive downlink control information (DCI) including a subcarrier indication field from a base station, a control unit configured to configure a wireless resource of an uplink data channel based on at least one of i) the subcarrier indication field and ii) subcarrier spacing information configured to NB IoT user equipment, and a transmitting unit configured to the uplink data using the wireless resource of the uplink data channel.

In addition, one embodiment provides a base station receiving an uplink data from a NB IoT user equipment. The base station may include a transmitting unit configured to transmit downlink control information (DCI) including a subcarrier indication field to the NB IoT user equipment, and a receiving unit configured to receive the uplink data from the NB IoT user equipment through a wireless resource of an uplink data channel which is allocated based on at least one of i) the subcarrier indication field and ii) subcarrier spacing information configured to the NB IoT user equipment.

The above one embodiment provides an effect that solve a procedural ambiguity for transmitting an uplink data channel by allocating a wireless resource of an uplink data channel for transmitting an uplink data of the NB IoT user equipment by a base station.

BRIEF DESCRIPTION OF THE DRAWINGS

The above and other objects, features, and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a machine type communication (MTC) terminal refers to a terminal supporting low cost and low complexity or supporting coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the typical LTE coverage, or supports low power consumption. The MTC terminal may also refer to a newly defined Release 13 low cost (or low complexity) UE category/type.

The wireless communication system may be widely installed to provide various communication services, such as a voice service, a data packet service, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), LTE, high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed. The base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. (i) The base station may be a device itself that provides a megacell, a macrocell, a microcell, a picocell, a femtocell, and a small cell in association with a wireless area, or (ii) the base station may indicate a wireless area itself. In (i), all devices that interact with one another so as to enable the devices that provide a predetermined wireless area to be controlled by an identical entity or to cooperatively configure the wireless area may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In (ii), a wireless area itself that receives or transmits a signal from a perspective of a terminal or a neighboring base station may be indicated as a base station.

Therefore, a base station may be referred to as a megacell, a macrocell, a microcell, a picocell, a femtocell, a small cell, an RRH, an antenna, an RU, an LPN, a point, an eNB, a transmission/reception point, a transmission point, and a reception point.

In the specifications, the user equipment and the base station are used as two inclusive transceiving subjects to embody the technology and technical concepts described in the specifications. The user equipment and the base station may not be limited to a predetermined term or word. In the specification, the user equipment and the base station are used as two (uplink or downlink) inclusive transceiving subjects to embody the technology and technical concepts described in the specifications, and the user equipment and the base station may not be limited to a predetermined term or word. Here, Uplink (UL) refers to data transmission from a UE to a Base station or data reception at the Base station from the UE. Downlink (DL) refers to data transmission from a base station to a UE or data reception at the UE from the Base station.

Various multiple access schemes may be unrestrictedly applied to the wireless communication system. Various multiple access schemes may include CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. Embodiments of the present disclosure may be applicable to resource allocation in an asynchronous wireless communication scheme that has been advanced through GSM, WCDMA, and HSPA, to be LTE and LTE-advanced. The embodiments may be applicable to resource allocation in a synchronous wireless communication scheme that has been advanced through CDMA and CDMA-2000, to be UMB. However, embodiments of the present disclosure may not be limited to a specific wireless communication field and may include all technical fields in which the technical idea of the present disclosure is applicable.

Uplink transmission and downlink transmission may be performed based on a TDD (Time Division Duplex) scheme that performs transmission based on different times or based on an FDD (Frequency Division Duplex) scheme that performs transmission based on different frequencies.

Further, in a system such as LTE and LTE-Advanced, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like. The uplink and the downlink may be configured as a data channel, such as a PDSCH (Physical Downlink Shared CHannel), a PUSCH (Physical Uplink Shared CHannel), and the like, to transmit data.

On the other hand, control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system, a coordinated multi-antenna transmission system, or a coordinated multi-cell communication system, where two or more transmission/reception points cooperatively transmit a signal. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH. The physical downlink control channel may also indicate a meaning including both a PDCCH and an EPDCCH.

In addition, for ease of description, an EPDCCH may be applied to embodiments described using a PDCCH and to embodiments described using an EPDCCH.

Meanwhile, higher layer signaling includes RRC signaling that transmits RRC information including an RRC parameter in the specification.

An eNB executes downlink transmission to terminals. The eNB may transmit a Physical Downlink Shared Channel (PDSCH) which is a primary physical channel for unicast transmission. The eNB may also transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Each embodiment described below relates to a method and an apparatus for allocating resources of an uplink data channel for transmitting an uplink data of a NarrowBand Internet of Things (NB IoT) user equipment in 3GPP communication system. Particularly, a specific method and procedure may be provided for the NB IoT user equipment to allocate frequency axis wireless resources for the uplink data channel in accordance with at least one embodiment of the present disclosure.

In present specification, a user equipment to transmit and receive a data using a narrow band is described as a NarrowBand IoT user equipment (NB IoT user equipment). The NB IoT user equipment means a user equipment to transmit and receive a data using a narrow band (for example, 180 kHz) compared to a typical LTE or LTE-Advanced user equipment and includes various names like a MTC user equipment. Therefore, the NB IoT user equipment is a name used for convenience and ease of understand. Embodiments of the present disclosure are not limited thereto.

Furthermore, a NB IoT user equipment uses a downlink control channel, a downlink data channel, an uplink control channel, and an uplink data channel, etc like a LTE user equipment. Merely, because the NB IoT user equipment uses a narrow band unlike the LTE user equipment, a part of a composition or a structure of each channel could be changed. Therefore, the downlink control channel, the downlink data channel, the uplink control channel and the uplink data channel, etc described in the present specification should be understood to indicate a channel for the NB IoT user equipment. For differentiating the channel used in the NB IoT user equipment from a channel related to the typical LTE, "N" is added in front of a channel abbreviation of each channel for the NB IoT performing a same function in the LTE and described. For example, a PDCCH which is a downlink control channel in the LTE system is written and described as a NPDCCH in the NB IoT, a PUSCH which is an uplink data channel in the LTE system is written and described as a NPUSCH in the NB IoT. In addition, if it is necessary, "N" may be added in front of each information and signal like a system information not only a downlink channel and uplink channel, and be described.

Hereinafter, the NB IoT technology according to the present embodiments will be briefly described.

[NB IoT]

The objective is to specify a radio access for cellular internet of things, based to a great extent on a non-backward-compatible variant of E-UTRA that addresses improved indoor coverage, support for massive number of low throughput devices, low delay sensitivity, ultra low device cost, low device power consumption and (optimized) network architecture.

The NB IoT supports three operating modes as follows.

1. 'Stand-alone operation' utilizing for example the spectrum currently being used by GERAN systems as a replacement of one or more GSM carriers 2. 'Guard band operation' utilizing the unused resource blocks within a LTE carrier's guard-band 3. 'In-band operation' utilizing resource blocks within a normal LTE carrier As described, the NB IoT user equipment may operate independently. Further, the NB IoT user equipment also may operate in a band configured as a guard band of bandwidth.

In addition, it may operate in a band where a normal LTE user equipment operate as well as in the guard band.

Specifically, the NB IoT user equipment supports the following operations.

180 kHz UE RF bandwidth for both downlink and uplink
OFDMA on the downlink
  Two numerology options will be considered for inclusion: 15 kHz subcarrier spacing (with normal or extended CP) and 3.75 kHz subcarrier spacing. Technical analysis will either perform a down-selection or decide on inclusion of both based on the feasibility of meeting relevant requirements while achieving commonality (to be finalized by RAN #70)
For the uplink, two options will be considered: FDMA with GMSK modulation (as described in 3GPP TR 45.820 section 7.3), and SC-FDMA (including single-tone transmission as a special case of SC-FDMA)
  Technical analysis will either perform a down-selection or decide on inclusion of both
A single synchronization signal design for the different modes of operation, including techniques to handle overlap with legacy LTE signals
MAC, RLC, PDCP and RRC procedures based on existing LTE procedures and protocols and relevant optimizations to support the selected physical layer
Any enhancements to S1 interface to CN and related radio protocols to support the work SA2 is conducting on the systems aspects such as signaling reduction for small data transmissions As described above, the NB IoT user equipment may transmit and receive a downlink signal and an uplink signal with a base station in a narrower band than that of the typical normal LTE user equipment.

Additionally, the NB IoT user equipment may transmit the uplink signal through a single tone transmission and a multi tone transmission like below.

Figure 1:
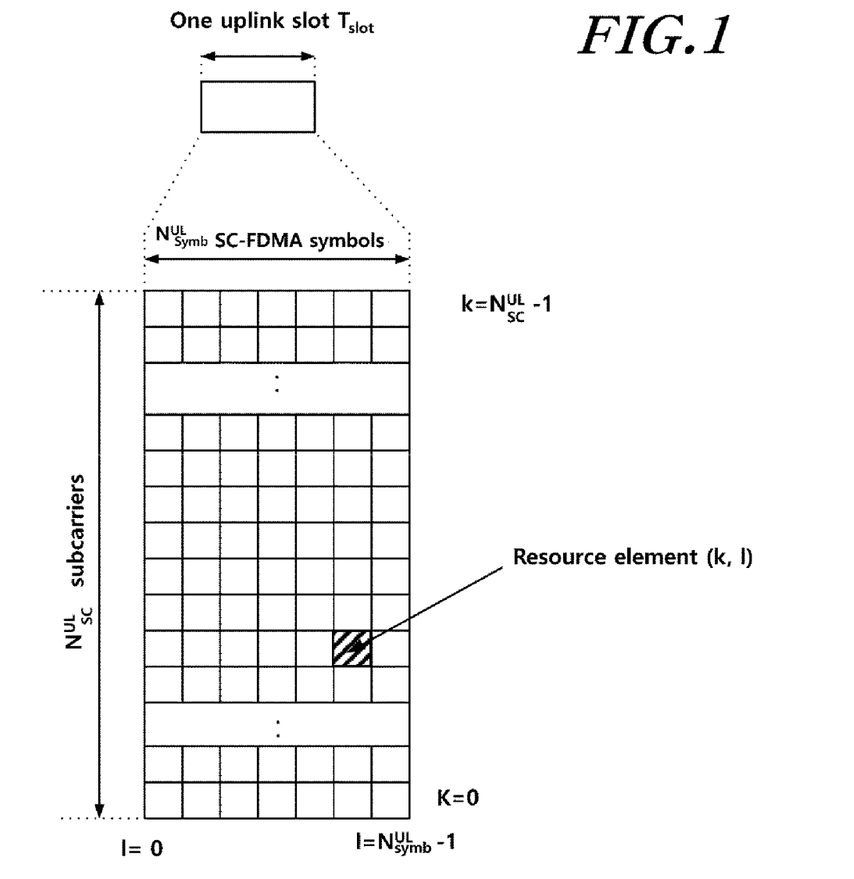
FIG. 1 is a diagram for explaining a resource grid in a NB IoT system.

Single-tone transmissions are supported
  2 numerologies should be configurable for Single-tone transmission: 3.75 kHz and 15 kHz
  A cyclic prefix is inserted
  Frequency domain Sync pulse shaping in the physical layer description
Multi-tone transmissions are supported
  Multi-tone transmissions are based on SC-FDMA
  15 kHz UL subcarrier spacing
Additional mechanisms for PAPR reduction FFS
The UE shall indicate the support of Single-tone and/or Multi-tone FIG. 1 is a diagram for explaining a resource grid in a NB IoT system.

Referring to FIG. 1, a NB-IoT user equipment transmits and receives uplink and downlink signals using a 180 kHz bandwidth. In case of the uplink, a resource element or a resource unit may be defined in the NB-IoT. For example, the resource element may be defined as an index pair of a subcarrier index and a symbol index, such as (k, l). That is, one uplink slot ($T_{slot}$) may be configured by $N_{symb}^{UL}$ number of SC-FDMA symbols in a time axis. In addition, $N_{SC}^{UL}$ number of subcarriers in a frequency axis may configure one bandwidth. As described above, the NB-IoT may process the uplink and downlink signals using 180 kHz. One uplink slot may include 7 symbols. In addition, each subcarrier may be defined as 15 kHz or 3.75 kHz. Therefore, when each subcarrier is allocated at 15 kHz intervals, 12 subcarriers may form one bandwidth. When subcarriers spacing is 3.75 kHz, a maximum of 48 subcarriers may form one bandwidth.

Meanwhile, as described above, the NB-IoT user equipment may support i) single tone transmission applied with two numerologies based on 3.75 kHz or 15 kHz and ii) multi-tone transmission using 15 kHz spacing based on SCK-FDMA. That is, for the uplink transmission of the NB-IoT UE, each UE may selectively apply one of a single tone-based uplink transmission method and a multi tone-based uplink transmission method.

In addition, when the single tone-based transmission is performed, uplink numerologies may be individually set based on 3.75 kHz subcarrier spacing and based on 15 kHz subcarrier spacing.

Meanwhile, in configuring one resource unit as a resource allocation unit of the uplink data channel NPUSCH for the NB IoT user equipment, the resource unit may be configured differently depending on i) a subcarrier spacing and ii) whether a multi-tone transmission of the corresponding NB IoT user equipment is supported or not.

Especially, when the NB IoT user equipment supports a multi-tone transmission, an uplink data channel resource unit may be defined to include i) 1 subcarrier×8 ms, ii) 3 subcarriers×4 ms, and iii) 6 subcarriers×2 ms except a typical uplink data channel resource unit including 12 subcarriers×1 ms. In addition, a resource unit may be configured to including i) 2 subcarriers×6 ms and ii) 4 subcarriers×3 ms. Besides, various sized resource unit may be configured and used.

Therefore, it is necessary to define a method for allocating wireless resources for NPUSCH transmission of the NB IoT user equipment specifically, according to i) whether the NB IoT user equipment supports a single-tone or a multi-tone or not and ii) a resource unit type when supporting the multi-tone. That is, it is necessary to define a method for allocating uplink data channel wireless resources for the NB IoT user equipment having various conditions. A wireless resource allocation or a wireless resource configuration in the present specification may be understood as a meaning that configuring a resource unit which is a transmission unit of the uplink data channel.

Hereinafter, embodiments of a method for allocating a wireless resource for an uplink data channel by a base station will be described. each embodiment may be applied as combined or aggregated each other.

The First Embodiment: A Method for Scheduling an NPUSCH for the NB IoT User Equipment Supporting Single Tone Transmission In case of the NB IoT user equipment supporting a single-tone transmission, two different uplink numerologies based on 3.75 kHz or 15 kHz subcarrier spacing are configured. In case of a single-tone transmission based on 3.75 kHz subcarrier spacing, uplink bandwidth (180 kHz) of one NB IoT may include total 48 subcarriers. In case of a single-tone transmission based on 15 kHz subcarrier spacing, uplink bandwidth (180 kHz) of one NB IoT may include total 12 subcarriers.

Accordingly, as an frequency resource allocation method for allocating an NPUSCH transmission resource of the NB IoT user equipment, the base station may process an uplink grant to include a subcarrier index allocation information and transmit the subcarrier index allocation information for a corresponding NB IoT user equipment to use for transmitting an NPUSCH through an NPDCCH. For example, the base station may process downlink control information of the NPDCCH to include a subcarrier indication field and transmit to each NB IoT user equipment. The NB IoT user equipment may check the subcarrier indication field of the received downlink control information and acquire information of a frequency axis wireless resource (for example, subcarrier index) for the NPUSCH transmission.

In this case, when 3.75 kHz subcarrier spacing is configured, corresponding subcarrier index allocation information included in an uplink grant includes 6 bits and is configured one of values from '000000' corresponding to subcarrier indexes #0 to '101111' corresponding to subcarrier index #47. That is, the base station may allocate a subcarrier index allocated for an NPUSCH through a subcarrier indication field including 6 bits directly. When a subcarrier spacing of the NB IoT user equipment is 3.75 kHz, a subcarrier index indicated through the subcarrier indication field may be one.

When the NB IoT user equipment is configured as 15 kHz subcarrier spacing, and when a subcarrier index allocation information including 4 bits and is configured one of values from '0000' corresponding to subcarrier indexes #0 to '1011' corresponding to subcarrier index #11, it may be defined to signal a subcarrier index allocated for a corresponding NPUSCH directly.

Alternatively, even if 15 kHz subcarrier spacing is configured, information area of 6 bits may be defined for corresponding subcarrier index allocation information. The base station may perform signaling of allocated subcarrier index information among corresponding 12 subcarrier indexes through most significant bit (MSB) 4 bits or least significant bit (LSB) 4 bits directly. In this case, 2 bits not used may be fixed as arbitrary values.

Alternatively, even if the NB IoT user equipment is configured as 15 kHz subcarrier spacing, the base station may allocate 12 subcarrier indexes as signaling using a subcarrier indication field including 6 bits. In addition, remaining index of 6 bits may be used for allocating a subcarrier set for a multi-tone transmission.

When a subcarrier indication field including 6 bits, subcarrier index is allocated to the NB IoT user equipment, and remaining index may be reserved.

The Second Embodiment: A Method for Scheduling an NPUSCH for the NB IoT User Equipment Supporting Multi-Tone Transmission In case of the NB IoT user equipment supporting a multi-tone transmission, the base station may transmit information for allocating a wireless resource of an NPUSCH of the NB IoT user equipment through an NPDCCH. That is, when a type of a resource unit to use for an NPUSCH resource allocation of a NB IoT user equipment is semi-statically or dynamically determined among a plurality of resource units defined for an NPUSCH transmission resource allocation, a corresponding NB IoT user equipment may transmit an NPUSCH as configured resource unit. Therefore, based on these, an allocation of a wireless resource (for example, time-frequency resource) for an NPUSCH transmission is performed through an uplink grant.

Figure 2:
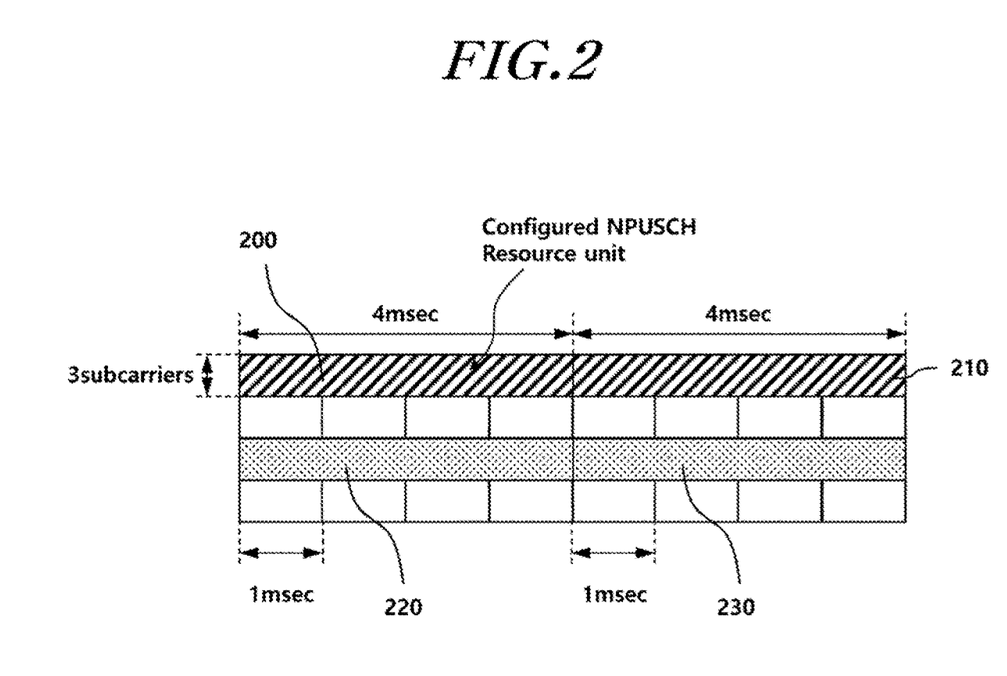
FIG. 2 is a diagram for explaining an uplink data channel resource unit according to one embodiment.

In this case, when allocation of an NPUSCH resource including a plurality of resource units is performed for an NPUSCH transmission of a NB IoT user equipment, a resource structure of an NPUSCH is defined so that a resource unit composing a corresponding NPUSCH transmission resource maintains a time division multiplexing (TDM) type. That is, when allocating resources for a PUSCH transmission of one NB IoT user equipment, a plurality of resource units are configured not to be multiplexed at a frequency axis and allocated in single uplink subframe. Referring to FIG. 2, when an NPUSCH resource unit type configured for a NB IoT user equipment is a resource unit type based on 3 subcarriers×4 ms, it is necessary to allocate two resource units each including 3 subcarriers×4 ms for an NPUSCH transmission of a corresponding NB IoT. In this case, it may be supported to allocate an NPUSCH resource of TDM scheme (that is, a type of repetition that a corresponding resource unit is allocated repetitively in a time axis). That is, one NB IoT user equipment is allocated resource units 200 and 210. As described above, multiplexing may be supported by TDM scheme for a NB IoT user equipment.

In this case, NPUSCH wireless resource allocation information included in downlink control information may include start subcarrier index information of a resource unit composing a corresponding NPUSCH and a repetition number in a time axis. For example, 12 uplink subcarriers (indexes of subcarrier #0~subcarrier #11) form an uplink bandwidth of the NB IoT user equipment. A start subcarrier index is a index of a first subcarrier starting 3 consecutive subcarriers that forms a resource unit for a corresponding NPUSCH allocation. A value of such a start subcarrier index may be determined among subcarrier #0~subcarrier #11. In addition, the base station may set a repetition number of a resource unit in a time axis and perform signaling through a downlink control information.

Meanwhile, to reduce information area of downlink control information, the start subcarrier index is limited according to the number of subcarriers forming a corresponding resource unit when allocating a start subcarrier index of a resource unit. For example, if the number of subcarriers composing a corresponding resource unit is N, only subcarriers becoming 0 after applying modulo N thereto are determined as a subcarrier starting a resource unit allocation for an NPUSCH transmission. In this case, among a resource unit allocation information included in a corresponding downlink control information, a size of a start subcarrier allocation information area may be reduced. That is, in a case of the NB IoT user equipment configured a resource unit of 3 subcarriers×4 ms as FIG. 2, candidates of a frequency domain to allocate through one subframe are limited as four (for example, a start subcarrier index which is possible to allocate is limited as 0, 3, 6, 9). In this case, allocation information may be provided by only 2 bits frequency resource allocation information.

Alternatively, based on a method above, the base station may schedule an allocation information for an NPUSCH transmission of a corresponding NB IoT user equipment among these total 19 NPUSCH allocation candidates including 1 candidate for an NPUSCH allocation based on a resource unit of 12 subcarriers×1 ms, 2 candidates for an NPUSCH allocation based on a resource unit of 6 subcarriers×2 ms (subcarrier #0~#5, subcarrier #6~#11), 4 candidates for an NPUSCH allocation based on a resource unit of 3 subcarriers×4 ms (subcarrier #0~#2, subcarrier #3~#5, subcarrier #6~#8, subcarrier #9~#11) and 12 candidates for an NPUSCH allocation based on a resource unit of 1 subcarrier×8 ms. Then, the base station may transmit the scheduled allocation information through a downlink control information to the NB IoT user equipment.

Figure 3:
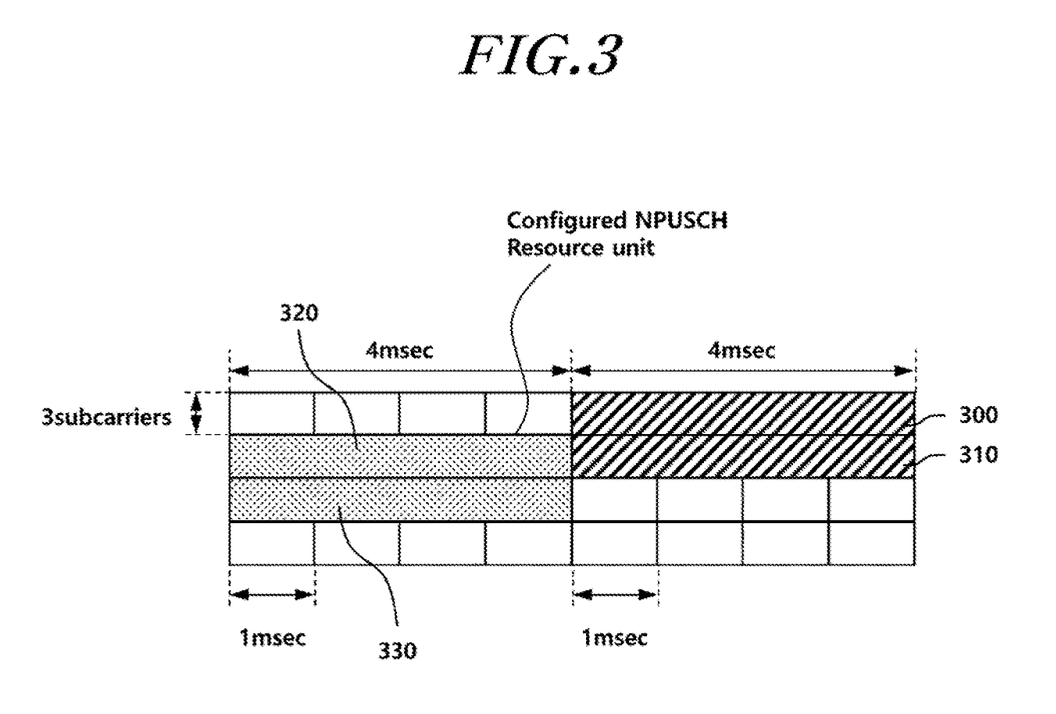
FIG. 3 is a diagram for explaining an uplink data channel resource unit according to other embodiment.

FIG. 3 is a diagram for explaining an uplink data channel resource unit according to another embodiment. As another method for allocating a wireless resource for an NPUSCH transmission of the NB IoT user equipment supporting a multi-tone transmission, when allocating a resource for an NPUSCH transmission of one NB IoT user equipment as shown in FIG. 3, a plurality of resource units may be multiplexed in a frequency axis and allocated in a single uplink subframe. That is, a plurality of resource unit may be allocated to be multiplexed as FDM scheme for an NPUSCH transmission of one NB IoT user equipment in a single uplink subframe. For example, when a resource unit of one NB IoT user equipment is allocated as 3 subcarriers×4 ms as shown in FIG. 3, two resource unit may be allocated as FDM scheme as 320 and 330 in 4 ms. Similarly, in other NB IoT user equipment, resource units 300 and 310 may be allocated as FDM scheme.

In this case, frequency resource allocation information included in downlink control information for a corresponding NPUSCH allocation may include start subcarrier index information likewise a case of TDM scheme described above. In addition, N value which is the number of a resource unit additionally allocated (for example, in a case of FIG. 3, N is configured as 2) may be included. In addition, a repetition number of corresponding resource units in a time axis may be signaled through corresponding downlink control information.

In above, to make it easy to understand, although it is described based on a case configured a resource unit based on 3 subcarriers×4 ms for a multi-tone transmission of the NB IoT user equipment, the embodiments may be applied similarly to a case of an uplink resource unit of 12 subcarriers×1 ms, or an uplink resource unit of 1 subcarrier×8 ms, 6 subcarriers×2 ms is configured. In addition, a same method may be applied if an uplink resource unit of 2 subcarriers×6 ms and 4 subcarriers×3 ms is defined or other type of resource unit is defined.

Figure 4:
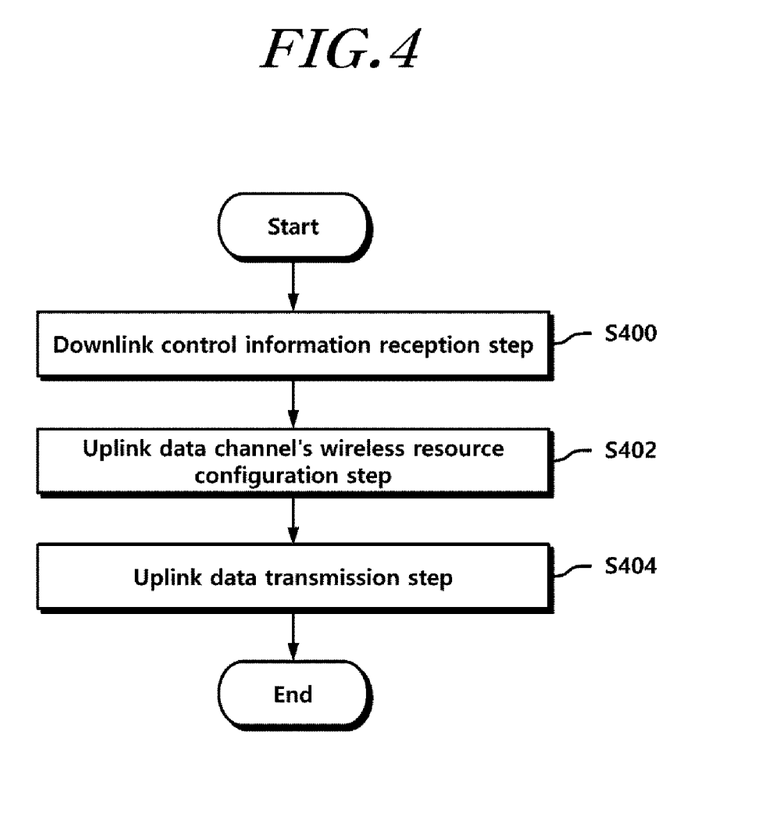
FIG. 4 is a flowchart for explaining operations of a NB IoT user equipment according to at least one embodiment.

Hereinafter, operations of a NB IoT user equipment according to the above-described first and second embodiments will be described. FIG. 4 is a flowchart for explaining operations of a NB IoT user equipment according to at least one embodiment.

Referring to FIG. 4, the NB IoT user equipment may perform operations of receiving downlink control information (DCI) including a subcarrier indication field from the base station at step S400. For example, the NB IoT user equipment receives downlink control information through an NPDCCH. The downlink control information may include a scheduling information to receive an NPDSCH. In addition, the downlink control information may include wireless resource allocation information for NPUSCH transmission. For example, a subcarrier indication field includes 6 bits and may include information indicating at least one consecutive subcarrier allocated as a frequency axis wireless resource of an NPUSCH.

The NB IoT user equipment may perform operations of configuring a wireless resource of an uplink data channel based on at least one of i) a subcarrier indication field and ii) subcarrier spacing information configured at the NB IoT user equipment at step S402. The NB IoT user equipment may determine a frequency axis wireless resource of an uplink data channel using at least one of i) a subcarrier indication field and ii) subcarrier spacing information of a corresponding NB IoT user equipment using a downlink control information.

As one example, when subcarrier spacing information of the NB IoT user equipment is 3.75 kHz, a subcarrier indication field may include information indicating one of subcarrier index from no. 0 to no. 47. That is, because a subcarrier indication field may include 6 bits, it may include index information indicating 48 subcarrier index, and remaining index may be reserved. In this case, a resource unit for NPUSCH transmission may include one subcarrier. That is, it may be a single-tone transmission scheme described above.

As another example, when subcarrier spacing information of the NB IoT user equipment is 15 kHz, a subcarrier indication field may include information indicating one of a plurality of subcarrier sets including N consecutive subcarriers. Here, N may be one of 1, 3, 6 and 12. That is, when a subcarrier spacing of the NB IoT user equipment is 15 kHz, a wireless resource for NPUSCH transmission may be allocated to a resource unit including 1, 3, 6 or 12 subcarriers. Accordingly, the base station may indicate a subcarrier set including N consecutive subcarrier through downlink control information.

Specifically, a subcarrier indication field may include information indicating one of subcarrier indexes from 0 to 11 when N is 1. Alternatively, a subcarrier indication field may include information indicating one of subcarrier sets {0, 1, 2}, {3, 4, 5}, {6, 7, 8} and {9, 10, 11} each including 3 consecutive subcarrier indexes when N is 3. Alternatively, a subcarrier indication field may include information indicating one of subcarrier sets {0, 1, 2, 3, 4, 5} and {6, 7, 8, 9, 10, 11} each including 6 consecutive subcarrier indexes when N is 6. Alternatively, a subcarrier indication field may include information indicating a subcarrier set {0, 1, 2, 3, 4, 5, 6, 7, 8, 9, 10, 11} including 12 consecutive subcarrier indexes when N is 12. As described above, the numbers 1 to 11 denote a subcarrier index.

Figure 5:
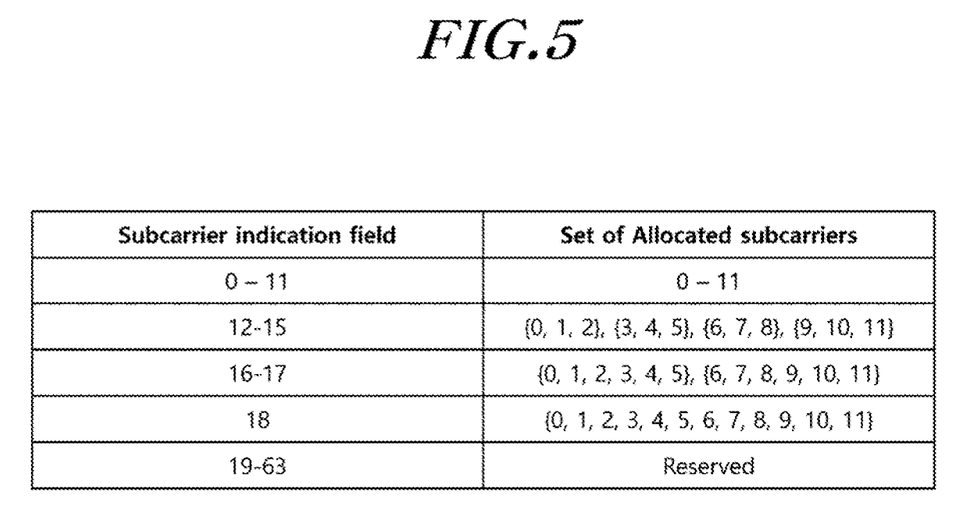
FIG. 5 is a diagram for explaining information indicating a subcarrier set according to at least one embodiment.

In summary, a subcarrier set indicated by a subcarrier indication field may be set as shown in FIG. 5. Referring to FIG. 5, indexes 0 to 11 of a subcarrier indication field indicate a subcarrier set when N is 1. In this case, because a subcarrier spacing of the NB IoT user equipment is 15 kHz and a bandwidth is 180 kHz, total 12 subcarrier index may be indicated. In addition, indexes 12 to 15 of a subcarrier indication field indicate a subcarrier set when N is 3. A subcarrier set includes 3 consecutive subcarrier indexes as described above. Likewise, indexes 16 to 17 of a subcarrier indication field indicate a subcarrier set when N is 6, index 18 of a subcarrier indication field indicates a subcarrier set when N is 12. Indexes 19 to 63 of a subcarrier indication field are reserved.

Besides, as described in the second embodiment, indexes of a subcarrier indication field may include information indicating a start subcarrier index included in each subcarrier set when N is 3, 6, 12. For example, because a subcarrier set includes consecutive subcarrier indexes, each index of a subcarrier indication field may indicate one of a start subcarrier index 0, 3, 6 or 9 of each subcarrier set when N is 3.

The NB IoT user equipment may perform operations of transmitting an uplink data using a wireless resource of an uplink data channel at step S404. For example, the NB IoT user equipment transmits an uplink data to the base station, using a wireless resource of an uplink data channel allocated at the step S402.

Figure 6:
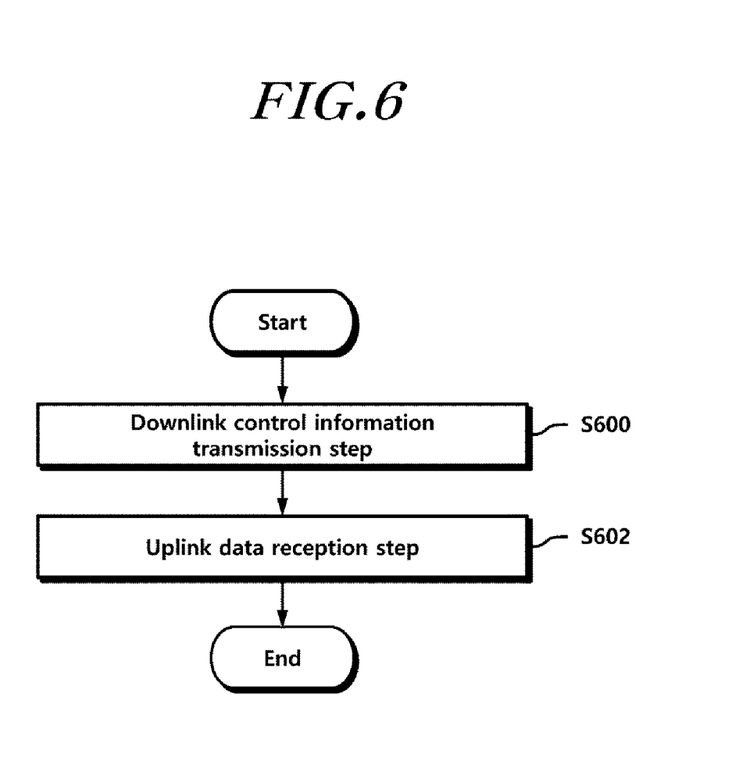
FIG. 6 is a flowchart for explaining operations of a base station according to at least one embodiment.

Hereinafter, operations of a base station according to the above described embodiments will be described. FIG. 6 is a flowchart for explaining operations of a base station according to at least one embodiment.

Referring to FIG. 6, the base station may perform operations of transmitting downlink control information (DCI) including a subcarrier indication field to the NB IoT user equipment at step S600. For example, the base station transmits downlink control information through an NPDCCH. The downlink control information may include i) scheduling information for NPDSCH transmission or ii) wireless resource allocation information for NPUSCH transmission. For example, a subcarrier indication field includes 6 bits and may include information indicating at least one consecutive subcarrier allocated as a frequency axis wireless resource of an NPUSCH.

The base station may perform operations of receiving an uplink data from the NB IoT user equipment through a wireless resource of an uplink data channel configured based on at least one of i) a subcarrier indication field and ii) subcarrier spacing information configured to the NB IoT user equipment at step S602. The base station receives an uplink data using a wireless resource of an uplink data channel allocated to the NB IoT user equipment. A wireless resource of an uplink data channel may be configured by at least one of i) a subcarrier indication field and ii) subcarrier spacing information of each NB IoT user equipment described above.

As one example, when subcarrier spacing information of the NB IoT user equipment is 3.75 kHz, a subcarrier indication field may include information indicating one of subcarrier indexes from no. 0 to no. 47. That is, since a subcarrier indication field may include 6 bits, the subcarrier indication field includes index information indicating 48 subcarrier indexes and remaining indexes may be reserved. In this case, a resource unit for an NPUSCH transmission may include one subcarrier.

As another example, when subcarrier spacing information of the NB IoT user equipment is 15 kHz, a subcarrier indication field may include information indicating one of a plurality of subcarrier sets each including N consecutive subcarriers. Here, N is one of 1, 3, 6 and 12. That is, when a subcarrier spacing of the NB IoT user equipment is 15 kHz, a wireless resource for an NPUSCH transmission may be allocated to a resource unit including 1, 3, 6 or 12 subcarriers. Therefore, the base station may indicate a subcarrier set including N consecutive subcarriers through downlink control information.

Specifically, a subcarrier indication field may include information indicating one of subcarrier indexes from 0 to 11 when N is 1. Alternatively, a subcarrier indication field may include information indicating one of subcarrier sets {0, 1, 2}, {3, 4, 5}, {6, 7, 8} and {9, 10, 11} each including 3 consecutive subcarrier indexes when N is 3. Alternatively, a subcarrier indication field may include information indicating one of subcarrier sets {0, 1, 2, 3, 4, 5} and {6, 7, 8, 9, 10, 11} each including 6 consecutive subcarrier indexes when N is 6. Alternatively, a subcarrier indication field may include information indicating a subcarrier set {0, 1, 2, 3, 4, 5, 6, 7, 8, 9, 10, 11} including 12 consecutive subcarrier indexes when N is 12. The numbers 1 to 11 denote a subcarrier index.

Besides, as described above, an index of a subcarrier indication field may include information indicating a start subcarrier index included in each subcarrier set when N is 3, 6, 12. For example, since a subcarrier set includes 3 consecutive subcarrier indexes, each index of a subcarrier indication field may indicate one of start subcarrier indexes 0, 3, 6 and 9 of each subcarrier set when N is 3.

In accordance with at least one embodiment, the above described operations of the user equipment and the base station can overcome a procedural ambiguity produced caused in uplink data channel transmission to allocate a wireless resource of an uplink data channel for an uplink data transmission of the NB IoT user equipment by the base station.

Hereinafter, a NB IoT user equipment and a base station that performs the above described operations according to at least one embodiments described above will be described.

Figure 7:
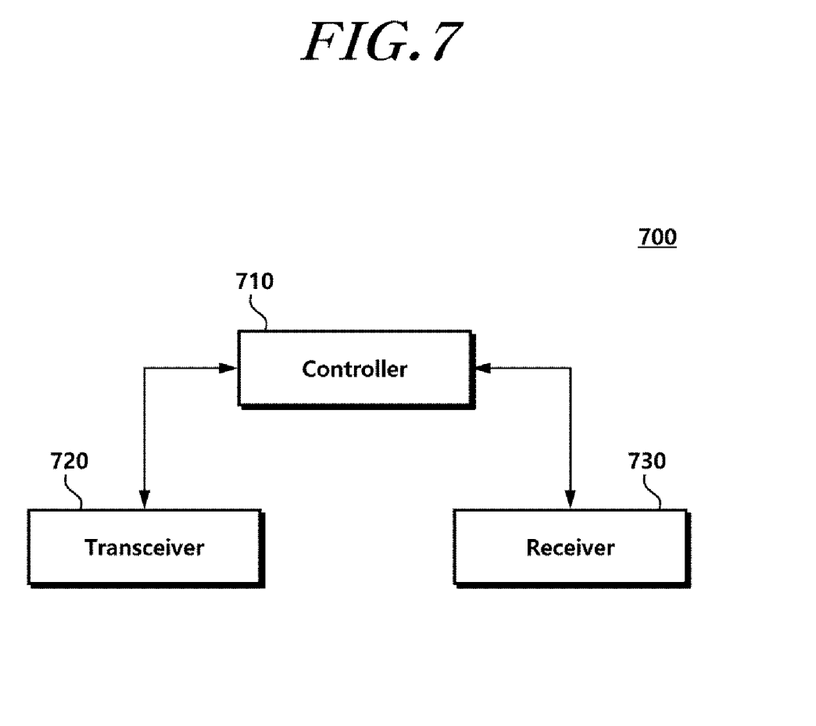
FIG. 7 is a diagram illustrating a NB IoT user equipment according to at least one embodiment.

FIG. 7 is a diagram showing a NB IoT user equipment according to at least one embodiment.

Referring to FIG. 7, the NB IoT user equipment 700 may include a receiver 730 to receive downlink control information (DCI) including a subcarrier indication field from the base station, a controller 710 to configure a wireless resource of an uplink data channel based on at least one of a subcarrier indication field and subcarrier spacing information configured to the NB IoT user equipment, and the transceiver 720 to transmit an uplink data using a wireless resource of an uplink data channel.

A subcarrier indication field includes 6 bits and may include information indicating one more consecutive subcarrier allocated as a frequency axis wireless resource of an uplink data channel.

The controller 710 may confirm a wireless resource of an uplink data channel by checking a subcarrier index indicated by an index of a subcarrier indication field or a subcarrier set using a received subcarrier indication field and subcarrier spacing information. As described above, when subcarrier spacing information of the NB IoT user equipment is 3.75 kHz, a subcarrier indication field may include information indicating one of subcarrier indexes from no. 0 to no. 47. Alternatively, when subcarrier spacing information of the NB IoT user equipment is 15 kHz, a subcarrier indication field may include information indicating one of a plurality of subcarrier sets each including N consecutive subcarriers. Alternatively, an index of a subcarrier indication field may include information indicating a start subcarrier index included in each subcarrier set when N is 3, 6, 12.

Besides, the controller 710 controls overall operations of the NB IoT user equipment 700 to configure a wireless resource of an uplink data channel by checking information of a subcarrier indication field, to transmit an uplink data to the base station, based on the checked information.

The receiver 730 receives a downlink data, message, etc from the base station through a corresponding channel. Alternatively, the transceiver 720 transmits uplink control information, data, and a message to the base station through a corresponding channel.

Figure 8:
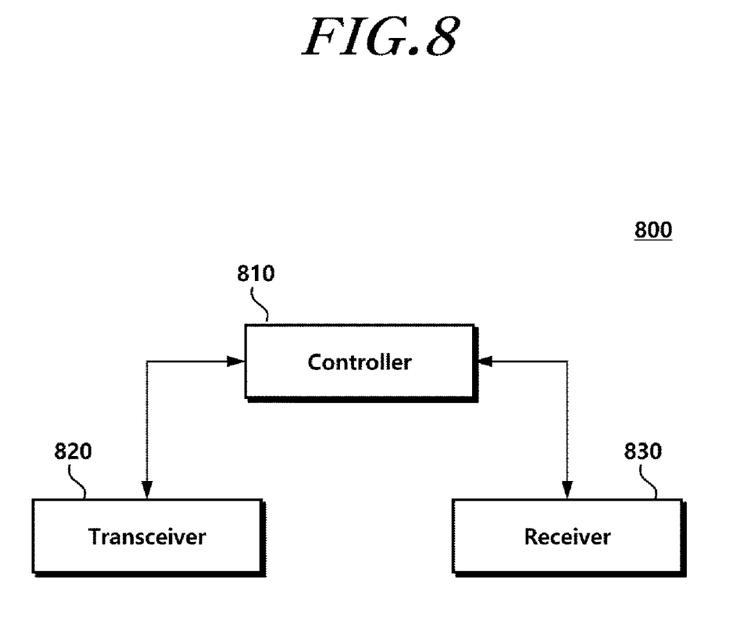
FIG. 8 is a diagram illustrating a base station according to at least one embodiment.

FIG. 8 is a diagram showing a base station according to at least one embodiment.

Referring to FIG. 8, the base station 800 may include a transceiver 820 to transmit downlink control information (DCI) including a subcarrier indication field to the NB IoT user equipment, and a receiver 830 to receive an uplink data from the NB IoT user equipment through a wireless resource of an uplink data channel allocated based on at least one of i) a subcarrier indication field and ii) subcarrier spacing information configured at the NB IoT user equipment.

A controller 810 controls overall operations of the base station 800 to generate information of a subcarrier indication field, to allocate uplink data scheduling information of each NB IoT user equipment by transmitting the subcarrier indication field to the NB IoT user equipment.

In addition, the controller 810 may allocate a wireless resource of an uplink data channel to be used by each NB IoT user equipment considering subcarrier spacing information of the NB IoT user equipment. Allocated subcarrier index information may be included in a subcarrier indication field of downlink control information. As described above, when subcarrier spacing information of the NB IoT user equipment is 3.75 kHz, a subcarrier indication field may include information indicating one of subcarrier indexes from no. 0 to no. 47. Alternatively, when subcarrier spacing information of the NB IoT user equipment is 15 kHz, a subcarrier indication field may include information indicating one of a plurality of subcarrier sets each including consecutive subcarriers. Alternatively, an index of a subcarrier indication field may include information indicating a start subcarrier index included in each subcarrier set when N is 3, 6, 12.

Besides, the transceiver 820 and the receiver 830 are used to transmit and receive a signal, a message, and a data which are necessary to perform the above described operations according to the at least one embodiment with the NB IoT user equipment.

Standard contents or standard documents mentioned in the above embodiment are omitted to simplify the description of the specification and constitute a part of the present specification. Therefore, it should be understood that adding some of the above standard contents and standard documents to the present specification or describing the same in claims are within the scope of the present disclosure.

Although a preferred embodiment of the present disclosure has been described for illustrative purposes, those skilled in the art will appreciate that various modifications, additions, and substitutions are possible without departing from the scope and spirit of the embodiments of the present disclosure as disclosed in the accompanying claims. Therefore, exemplary aspects of the present disclosure have not been described for limiting purposes. The scope of the present disclosure shall be construed based on the accompanying claims in such a manner that all the technical ideas included within the scope equivalent to the claims belong to the present disclosure.

What is claimed is:

1. A method for transmitting an uplink data by a Narrow-Band Internet of Things (NB IoT) user equipment, the method comprising:
   receiving downlink control information (DCI) including a subcarrier indication field from a base station;
   configuring a wireless resource of an uplink data channel based on i) the subcarrier indication field, ii) subcarrier spacing information associated with the NB IoT user equipment, and iii) number information of resource units allocated to the uplink data channel; and
   transmitting the uplink data using the wireless resource of the uplink data channel,
   wherein the subcarrier indication field includes a fixed size of 6 bits in all cases when the subcarrier spacing information is 3.75 kHz and the subcarrier spacing information is 15 kHz and includes information indicating at least one consecutive subcarrier allocated as a frequency axis wireless resource of the uplink data channel,
   wherein the downlink control information further includes the number information of resource units allocated to the uplink data channel,
   wherein the subcarrier indication field includes information which indicates one of a plurality of subcarrier sets each including N consecutive subcarriers when the subcarrier spacing information is 15 kHz, and wherein the N is one of 1, 3, 6 and 12,
   wherein when the subcarrier spacing information is 15 kHz, the subcarrier indication field includes information indicating one of subcarrier sets {0, 1, 2}, {3, 4, 5}, {6, 7, 8} and {9, 10, 11} each including 3 consecutive subcarrier indexes when N is 3, and information indicating one of subcarrier sets {0, 1, 2, 3, 4, 5} and {6, 7, 8, 9, 10, 11} each including 6 consecutive subcarrier indexes when N is 6, and
   wherein when the subcarrier spacing information is 15 kHz, indexes 0 to 11 of the subcarrier indication field indicate a subcarrier set when N is 1, indexes 12 to 15 of the subcarrier indication field indicate a subcarrier set when N is 3, indexes 16 to 17 of the subcarrier indication field indicate a subcarrier set when N is 6, index 18 of the subcarrier indication field indicates a subcarrier set when N is 12 and indexes 19 to 63 of a subcarrier indication field are reserved.

2. The method of claim 1, wherein the subcarrier indication field includes information which indicates one of subcarrier indexes from no. 0 to no. 47 when the subcarrier spacing information is 3.75 kHz.

3. The method of claim 1, where the subcarrier indication field includes information which indicates the subcarrier set {0, 1, 2, 3, 4, 5, 6, 7, 8, 9, 10, 11} including 12 consecutive subcarrier indexes when the N is 12.

4. A method for receiving an uplink data from a NB IoT user equipment by a base station, the method comprising:
   transmitting downlink control information (DCI) including a subcarrier indication field to the NB IoT user equipment; and
   receiving the uplink data from the NB IoT user equipment through a wireless resource of an uplink data channel which is configured based on i) the subcarrier indication field, ii) subcarrier spacing information associated with the NB IoT user equipment and iii) number information of resource units allocated to the uplink data channel,
   wherein the subcarrier indication field includes a fixed size of 6 bits in all cases when the subcarrier spacing information is 3.75 kHz and the subcarrier spacing information is 15 kHz, and includes information indicating at least one consecutive subcarrier allocated as a frequency axis wireless resource of the uplink data channel,
   wherein the downlink control information further includes the number information of resource units allocated to the uplink data channel,
   wherein the subcarrier indication field includes information which indicates one of a plurality of subcarrier sets each including N consecutive subcarriers when the subcarrier spacing information is 15 kHz, and wherein the N is one of 1, 3, 6 and 12,
   wherein when the subcarrier spacing information is 15 kHz, the subcarrier indication field includes information indicating one of subcarrier sets {0, 1, 2}, {3, 4, 5}, {6, 7, 8} and {9, 10, 11} each including 3 consecutive subcarrier indexes when N is 3, and information indicating one of subcarrier sets {0, 1, 2, 3, 4, 5} and {6, 7, 8, 9, 10, 11} each including 6 consecutive subcarrier indexes when N is 6, and
   wherein when the subcarrier spacing information is 15 kHz, indexes 0 to 11 of the subcarrier indication field indicate a subcarrier set when N is 1, indexes 12 to 15 of the subcarrier indication field indicate a subcarrier set when N is 3, indexes 16 to 17 of the subcarrier indication field indicate a subcarrier set when N is 6, index 18 of the subcarrier indication field indicates a subcarrier set when N is 12 and indexes 19 to 63 of a subcarrier indication field are reserved.

5. The method of claim 4, wherein the subcarrier indication field includes information which indicates one of subcarrier indexes from no. 0 to no. 47 when the subcarrier spacing information is 3.75 kHz.

6. A NB IoT user equipment transmitting an uplink data comprising:

a receiving unit configured to receive downlink control information (DCI) including a subcarrier indication field from a base station;

a control unit configured to configure a wireless resource of an uplink data channel based on i) the subcarrier indication field, ii) subcarrier spacing information configured to NB IoT user equipment, and iii) number information of resource units allocated to the uplink data channel; and a transmitting unit configured to the uplink data using the wireless resource of the uplink data channel, wherein the subcarrier indication field includes a fixed size of 6 bits in all cases when the subcarrier spacing information is 3.75 kHz and the subcarrier spacing information is 15 kHz, and includes information indicating at least one consecutive subcarrier allocated as a frequency axis wireless resource of the uplink data channel, wherein the downlink control information further includes the number information of resource units allocated to the uplink data channel, and wherein the subcarrier indication field includes information which indicates one of a plurality of subcarrier sets including N consecutive subcarriers when the subcarrier spacing information is 15 kHz, and wherein the N is one of 1, 3, 6 and 12 wherein when the subcarrier spacing information is 15 kHz, the subcarrier indication field includes information indicating one of subcarrier sets {0, 1, 2}, {3, 4, 5}, {6, 7, 8} and {9, 10, 11} each including 3 consecutive subcarrier indexes when N is 3, and information indicating one of subcarrier sets {0, 1, 2, 3, 4, 5} and {6, 7, 8, 9, 10, 11} each including 6 consecutive subcarrier indexes when N is 6, and wherein when the subcarrier spacing information is 15 kHz, indexes 0 to 11 of the subcarrier indication field indicate a subcarrier set when N is 1, indexes 12 to 15 of the subcarrier indication field indicate a subcarrier set when N is 3, indexes 16 to 17 of the subcarrier indication field indicate a subcarrier set when N is 6, index 18 of the subcarrier indication field indicates a subcarrier set when N is 12 and indexes 19 to 63 of a subcarrier indication field are reserved.

7. The NB IoT user equipment of claim 6, wherein the subcarrier indication field includes information which indicates one of subcarrier indexes from no. 0 to no. 47 when the subcarrier spacing information is 3.75 kHz.

8. The NB IoT user equipment of claim 6, wherein the subcarrier indication field includes information which indicates the subcarrier set {0, 1, 2, 3, 4, 5, 6, 7, 8, 9, 10, 11} including 12 consecutive subcarrier indexes when the N is 12.

* * * * *